E. O. SESSIONS.
CABLE END BELL.
APPLICATION FILED OCT. 20, 1910.
1,069,819.
Patented Aug. 12, 1913.
2 SHEETS—SHEET 1.
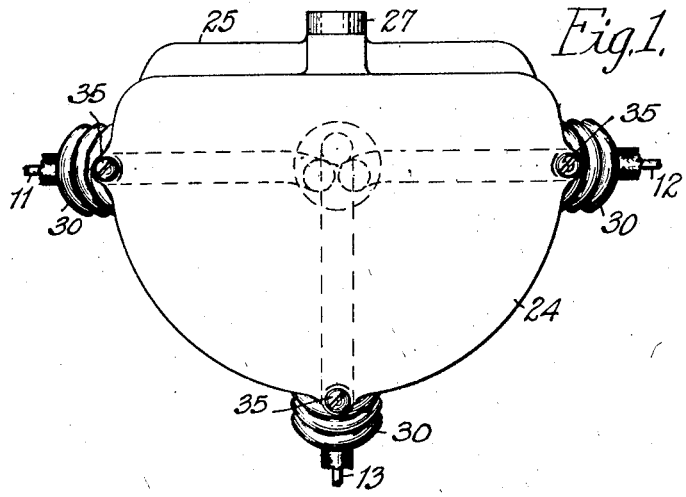
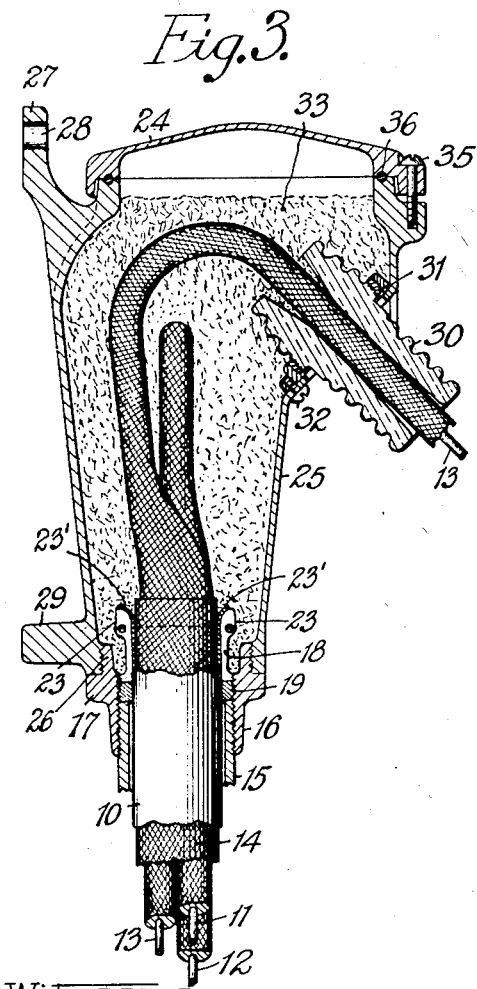
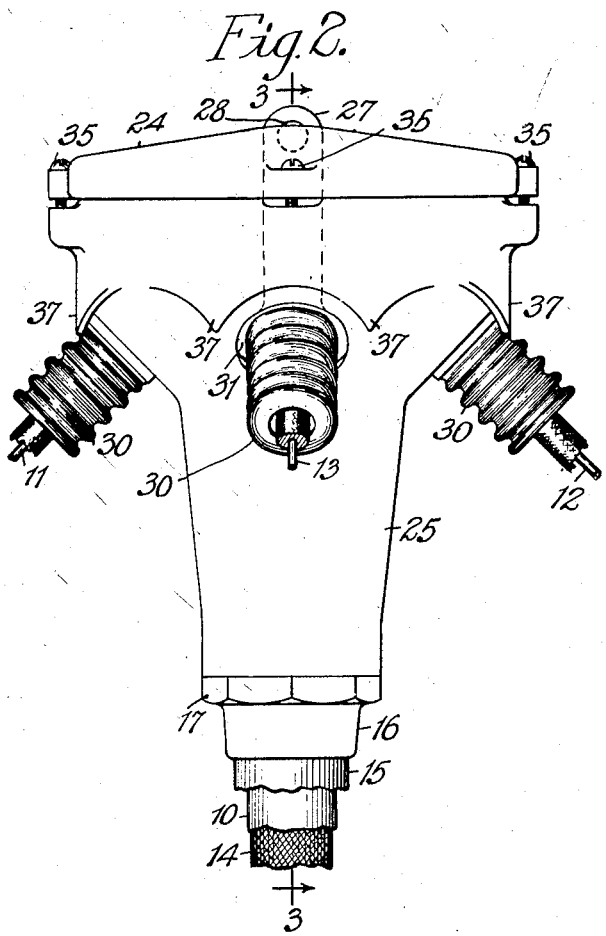
Witnesses
George E. Higham.
Leonard W. Novander.
Inventor
Edson O. Sessions
By
Attorneys E. O. SESSIONS.
CABLE END BELL.
APPLICATION FILED OCT. 20, 1910.
1,069,819. Patented Aug. 12, 1913.
2 SHEETS—SHEET 2.
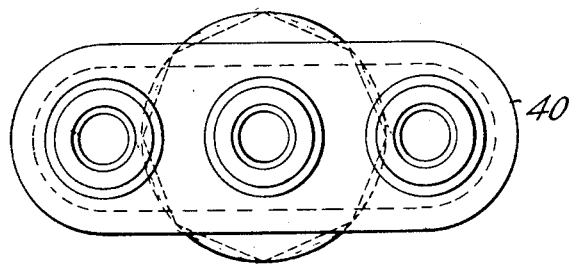
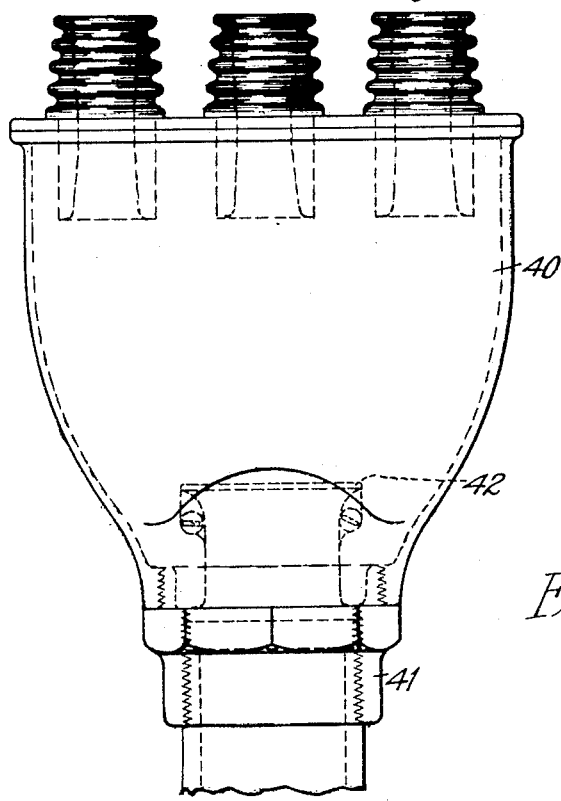
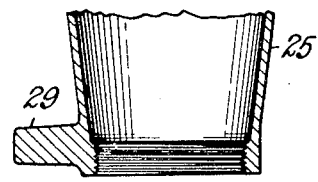
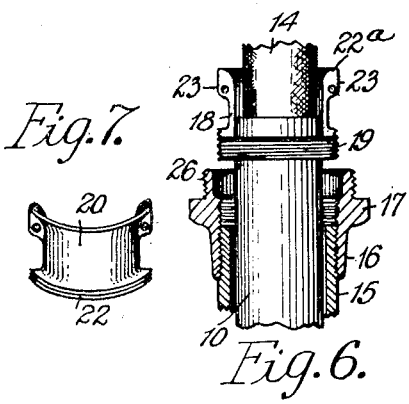
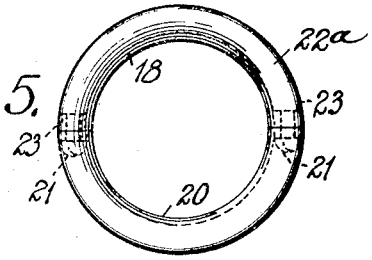
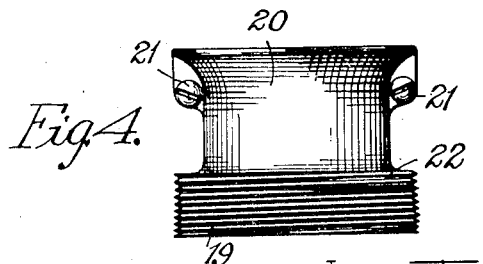
Witnesses
George E. Higham.
Leonard W. Novander.
Inventor
Edson O. Sessions
By Brown Williams
Attorneys

UNITED STATES PATENT OFFICE.

EDSON O. SESSIONS, OF CHICAGO, ILLINOIS, ASSIGNOR OF ONE-HALF TO FAY WOODMANSEE, OF CHICAGO, ILLINOIS.

CABLE-END BELL.

1,069,819.

Specification of Letters Patent. Patented Aug. 12, 1913.

Application filed October 20, 1910. Serial No. 568,015.

*To all whom it may concern:*

Be it known that I, EDSON O. SESSIONS, a citizen of the United States, residing at Chicago, in the county of Cook and State of Illinois, have invented a certain new and useful Improvement in Cable-End Bells, of which the following is a full, clear, concise, and exact description, reference being had to the accompanying drawings, forming a part of this specification.

My invention relates to cable end bells or potheads. In electrical construction work such devices are employed at the junction point between cable and aerial wires, as for example, where a cable runs from an underground conduit to the top of a pole where the conductors of the cable are connected with wires supported on the insulators carried by the pole.

It is important that moisture be excluded from the cable in order that the insulation may not be impaired. It is important also that static electricity, which in high tension work tends to accumulate in or on the sheath of the cable, be dissipated or carried to earth.

My invention is designed to accomplish these results and at the same time to provide a cable end bell which is substantial in construction and which readily adapts itself to the exigencies of construction work. Thus for example, if the cable end bell is to be mounted near the top of the pole and if the cable must be run through an iron pipe from the ground to the cable end bell, my invention provides a device in which a coupling member is first screwed over the upper end of the protecting pipe, the coupling member being provided with a polygonal flange adapted to accommodate the jaws of a wrench. The cable having been run through the pipe, a split brass or metal clamping ring is slipped over the end of the cable and down to the point at which it screw-threads into the upper part of the coupling member. The clamp is then tightened around the lead sheath of the cable, making a good electrical connection with the metal coupling, which is in good electrical connection with the protecting pipe which leads to ground. The upper end of the clamp ring is belled out so that the upper end of the sheath may be flared out over the clamping ring. This aids in supporting the cable, but it has also the important function of aiding in the discharge of any static or induced electricity which may tend to accumulate or which may be set up in the sheath of the cable. It is known that static electricity seeks the farthermost points or extremities of the conductors which it charges and the flaring of the lead sheath at its end causes the electricity to accumulate at the edge of the flared end, where it comes close to the clamping ring and where, therefore, it may readily be discharged.

The upper end of the coupling member is arranged for screw-threaded engagement with the metal casing of the pothead so that the casing may be screwed to the other members when the necessary work upon the cable proper has been completed. The conductors of the cable pass through insulators on their way to the outside, the insulators themselves being supported by rings or gaskets of non-magnetic material, which minimizes the generation of induced currents in case an alternating current passes through the conductors. The details of this and the various other features of my invention will be made more apparent by reference to the accompanying drawings, in which—

Figure 1 is a plan view of the cable end bell of my invention; Fig. 2 is a front elevation of the same; Fig. 3 is a cross-sectional view taken on the line 3, 3 of Fig. 2; Fig. 4 is a front elevation of the clamping member; Fig. 5 is a plan view of the same; Fig. 6 is a partial cross-sectional view of several of the parts partially assembled; Fig. 7 is an elevation of a section of the clamping ring to be associated with the parts shown in Fig. 6; and Figs. 8 and 9 are, respectively, a plan and front elevations of a modified form of cable end bell in which to a large extent the principles of my invention as illustrated in the other figures are applied.

Similar characters of reference are applied to like parts in the several figures.

Referring at the outset to the form shown in Figs. 1 to 7, inclusive, a cable is shown comprising a lead sheath 10, the three insulated conductors 11, 12 and 13, and an insulating covering 14 between the conductors and the lead sheath. An iron pipe 15 may be led from an underground conduit up the side of a pole not shown. In assembling the parts the coupling member 16 is first screwed upon the upper end of the pipe, advantage being taken of the polygonal flange 17 which accommodates the jaws of a wrench. The cable having been drawn through the pipe, the next step is to slip the ring member 18 of the clamp over the end of the cable and to bring it down, as shown in Fig. 6, to a position in which the threads 19 on the outside of the ring member of the clamp will engage the internal threads of the coupling member 16. When the ring part of the clamp has been slipped over the end of the cable, the detached segment 20 is brought into register with the ring member of the clamp. The clamp screws 21, 21 are inserted and partially tightened. The lower part of the segmental member 20 is provided with threads 22, which, with the threads of the ring member 18, complete the threaded flange of the clamping member. The clamping member is screwed home into the coupling member 16. The screws 21 are then tightened, thus bringing the segmental member of the clamp ring tightly into engagement with the cable on one side, while the collar or ring member of the clamp is tightened against the sheath of the cable on the other side. The upper end of the collar of the clamping member is belled or flared out, as shown at 22$^a$, the ears 23, 23 for the reception of the screws 21, 21 being cast on diametrically opposite sides of the clamping member just below the flare of the collar. The clamping member having been adjusted in this way, the lead sheath of the cable is flared out over the bell-shaped upper end of the clamping member, as best illustrated at 23' in Fig. 3. The cover 24 having been removed from the iron casing 25, the latter is now screwed over the threaded boss 26 of the coupling member 16. The casing is provided with a lug 27, having a hole 28 by means of which the pothead is hung from a spike or lag-screw driven into the pole. The strut 29 rests against the pole and maintains the pothead in an upright position. The lug and strut are of course available to support the pothead in upright position in any other place, as, for example, on the wall of a building. The several conductors of the cable having been separated as shown in Fig. 3, each is inserted through an insulator 30, which passes through the wall of the casing. Each insulator is directly supported by a brass ring 31 to which the insulator is cemented or otherwise attached, the brass ring in turn being fastened to the casing, as for example by means of the screw 32. The conductors having been arranged in place and having been passed through the several insulators to the outside, the casing is filled with insulating and sealing compound 33. The cover 24 may then be put in place and fastened by means of the screws 35, the gasket 36 aiding in the exclusion of moisture. It is to be noted that the holes through the insulators taper toward the middle, wherefor the insulating compound which is poured into the casing in molten condition flows into the flared inner ends of the insulators around the conductors. This detail prevents the insulating compound from breaking away from the conductor at the point where it enters the insulator, as would be likely to occur due to the expansion and contraction of the insulating compound caused by variations in temperature. The insulating compound hermetically seals the end of the cable and prevents moisture from gaining access to the interior of the sheath. The casing 25 is provided with depending projections 37 at either side of the several insulators. These projections collect the water which in a rain storm may fall upon the pothead, thus diverting it from the insulators and the conductors passing therethrough.

Having described this form of my invention, it will be apparent to those skilled in the art that it provides a cable end bell which may be assembled in place part by part and in such a way that all of the necessary work upon the end of the cable may be done with the greatest possible facility. It is unnecessary to reach down into the recesses of the casing in order to do the necessary work upon the end of the cable. The clamping ring supports the end of the cable securely and provides also a first class electrical connection between the end of the sheath and the earth by way of the coupling member 16 and the iron pipe 15 to which it is screwed. The flared upper end of the sheath tends to concentrate and collect any static electricity with which the sheath may become charged, and the static electricity will be readily discharged from the edge of this flared end of the sheath. The casing proper is screwed into place after all of the other work has been done, when it becomes necessary only to reach down into the casing and push the conductors through the openings to the outside. The casing when closed by the cover 24 is water-tight. The flow of an alternating current through the conductors which pass through the walls of the casing would tend to generate induced currents in the casing itself. The strength of such induced currents might be very considerable if the magnetic material of the casing were brought close to the conductors. To minimize this effect and also to provide a suitable mounting for the insulators the brass rings 31 are provided. On the whole, the construction is substantial, but still not costly in manufacture.

In Figs. 8 and 9 is shown a casing 40 of different shape, this form being adapted more particularly for use where the bell is not exposed to the weather and where also the conductors must leave the pothead in the same general direction as that in which the cable enters. The coupling member 41 and the clamping member 42 are not essentially different from those shown and described in connection with the other figures. So also the method of assembling the several parts is substantially the same as that already described.

What I claim as new and desire to secure by Letters Patent is set forth in the following claims:

1. In a cable end bell, the combination of a casing having a hole for the reception of a cable, a metal coupling member secured in said hole for the connection of an inclosing pipe, and a clamping member for engaging said coupling member, said clamping member being adapted to be secured about a cable entering the casing through said pipe.

2. In a cable end bell, the combination of a metal casing having a hole for the reception of a cable, a coupling member having direct screw-threaded engagement with the casing in said hole, and a clamping member independently supported by the coupling member and adapted to surround and engage a cable entering the casing.

3. In a cable end bell, the combination of a casing having a hole for the reception of a cable, a metal coupling member having screw-threaded engagement with an inclosing pipe and with the casing, and a split metal clamping member having screw-threaded engagement with the coupling member and adapted to surround and engage the sheath of the cable.

4. In a device of the class described, the combination of a cable with a metal sheath, a metal ring surrounding the sheath of the cable, the said ring having a detachable flared collar and the end of the metal sheath of the cable being flared out over the flared end of the collar.

5. A clamping member for supporting an electrical cable having a metal sheath, comprising a circular flange and a flared collar, one segment of the collar being integral with the flange and the other being detached, and means for clamping the two segments of the collar about the cable.

6. A clamping member for engaging and supporting an electrical cable comprising a screw-threaded flange and a collar having a flared end, one segment of the collar being integral with the screw-threaded flange and another segment of the collar being severed therefrom, ears upon the collar, and screws adapted to pass through the ears and to clamp the segments of the collar about the cable.

7. A supporting and clamping member for use in conjunction with lead covered cables comprising a flange and a collar, one segment of the collar being integral with the flange and the other segment of the collar being detachable therefrom, ears upon the segments of the collar, and screws passing through and engaging the ears to clamp the segments of the collar about the cable.

8. In combination, a cable having a metal sheath, a pipe surrounding the cable, a coupling member having an internal thread screwed over the end of the pipe, a polygonal flange around the periphery of the coupling member, an externally screw-threaded boss upon the coupling member, a casing adapted to hold an insulating or sealing compound having screw-threaded engagement with the boss of the coupling, and a metal clamping member having an externally screw-threaded flange adapted to screw into the internally threaded aperture in the coupling.

9. In combination, a cable having a metal sheath, a pipe surrounding the cable, a coupling member having an internal thread screwed over the end of the pipe, a polygonal flange around the periphery of the coupling member, an externally screw-threaded boss upon the coupling member, a casing adapted to hold an insulating or sealing compound having screw-threaded engagement with the boss of the coupling, and a metal clamping member comprising an externally screw-threaded flange adapted to be screwed into the internally threaded aperture of the coupling member, and a collar of which one segment is integral with the screw-threaded flange and of which the other segment is detached, both of the segments being provided with ears for the reception of screws whereby the segments of the collar may be clamped about the sheath of the cable.

10. In combination, a cable having a metal sheath, a pipe surrounding the cable, a coupling member having an internal thread screwed over the end of the pipe, an externally screw-threaded boss upon the coupling member, a casing adapted to hold an insulating or sealing compound having screw-threaded engagement with the boss of the coupling, and a metal clamping member supported by the coupling member and having a flared collar over which the end of the sheath of the cable may be spun.

11. In a device of the class described, the combination of a casing adapted to hold an insulating and sealing compound and having an opening therein, a cable with a metal sheath entering through said opening, and a metal ring surrounding the sheath of the cable and fitting in said opening, the said ring having a detachable flared collar and the metal sheath of the cable being flared out over the flared end of said collar.

12. In a cable end bell, the combination of a casing having a hole for the reception of a cable, a metal coupling member having a screw-threaded engagement with a pipe for inclosing the cable and with the casing, and a split metal clamping member having screw-threaded engagement with the inner end of the coupling member and adapted to surround and engage the sheath of the cable inside of the casing.

13. In combination, a casing having an opening for the entrance of a cable, a clamping ring comprising a collar having a screw-threaded portion arranged adjacent to said opening, said collar and a part of the screw-threaded portion being split into two segments, and means for tightening said segments together about the cable.

14. In a device of the class described, the combination with a casing having an opening therein, of a sheathed cable entering said opening, a pipe inclosing said cable outside of said casing, means for detachably securing said casing to said pipe, said cable having its sheath extending into said casing beyond the end of said pipe, a collar carried by said means and surrounding said sheath, said collar having an inner face over which the end of said sheath is flared, and an insulating compound in said casing in which the unsheathed end of said casing is embedded and which forms a seal for said cable where said sheath terminates.

15. In a device of the class described, the combination with a casing, means for retaining a cable in said casing detachably secured in an opening therein, a sheathed cable entering said casing through said opening, and a ring carried by said cable retaining means, the end of the cable sheath being flared over said ring.

16. In a device of the class described, the combination with a casing, of a pipe leading thereto, means associated with said pipe and said casing for closing the end of said casing, a sheathed cable entering said casing through said pipe, said means having a portion over which the end of said sheath may be bent to secure the same in place, and an insulating compound within said casing in which the unsheathed portion of said cable is embedded.

17. A cable end bell comprising a funnel shaped receptacle, a ring having screw threaded engagement with the small end thereof, said ring being adapted to receive loosely a sheathed cable, and a collar carried by said ring which extends inwardly therefrom, the sheath for said cable being arranged to terminate at the inner end of said collar whereby it may be flared out over the same.

18. A cable end bell comprising a funnel shaped receptacle, a sleeve screw-threaded externally and internally within the small end thereof, a ring screwed in said sleeve, said ring being adapted to receive loosely a sheathed cable, the sheath for said cable being arranged to terminate at the inner end of said ring, whereby it may be flared out over the same.

19. In a device of the class described, the combination with a casing having an opening therein of a sheathed cable entering said opening, a pipe inclosing said cable outside of said casing, means for detachably securing said casing to said pipe, said cable having a sheath extending into said casing beyond the end of said pipe, a detachable collar having screw threaded engagement with said means, and surrounding said sheath, said collar having an inner face over which the end of said sheath is flared, and an insulating compound in said casing in which the unsheathed end of said casing is embedded and which forms a seal for said cable where said sheath terminates.

20. A cable end bell comprising a funnel shaped receptacle, a ring having screw threaded engagement with the small end thereof, said ring being adapted to receive a sheathed cable, a collar carried by said ring, and means for clamping said collar to said sheath.

21. A cable end bell comprising a funnel shaped receptacle, a ring detachably secured in the small end thereof, said ring being adapted to receive a sheathed cable, a collar adapted to surround said cable and having a portion screw threaded within said ring, and means for clamping said collar to said sheath.

In witness whereof, I hereunto subscribe my name this 17th day of October, A. D. 1910.

EDSON O. SESSIONS.

Witnesses:
J. C. Atchison, Jr.,
R. G. York.